United States Patent [19]

Peterson et al.

[11] 4,441,697

[45] Apr. 10, 1984

[54] SILVER RECOVERY UNIT

[75] Inventors: Donny L. Peterson, Baytown; Michael L. Butts, Houston, both of Tex.

[73] Assignee: William E. Tipton, Jr., Houston, Tex.

[21] Appl. No.: 344,099

[22] Filed: Jan. 29, 1982

[51] Int. Cl.³ ............................................. C22B 5/00
[52] U.S. Cl. .................................... 266/170; 266/101; 75/118 P; 75/109; 75/118 R; 210/440; 210/441
[58] Field of Search ............. 266/170, 101; 75/118 P, 75/109, 118 R; 210/494, 440, 441, 94

[56] References Cited

U.S. PATENT DOCUMENTS

| | | | |
|---|---|---|---|
| 2,712,931 | 4/1951 | Maddock | 75/109 |
| 3,352,197 | 11/1967 | Porges | 210/94 |
| 3,392,838 | 7/1968 | Petrucci | 210/440 |
| 3,513,977 | 5/1970 | Bellinson | 210/94 |
| 4,192,751 | 3/1980 | Henton | 210/440 |

*Primary Examiner*—Edward J. Meros
*Assistant Examiner*—Robert L. Stoll
*Attorney, Agent, or Firm*—Fulbright & Jaworski

[57] ABSTRACT

An improved apparatus for recovering silver from a silver-containing solution. The device includes a container having influent and effluent passageways and a filler element composed of a metal above silver in the electromotive force series. The filler is disposed about an elongated core having an aperture in the side thereof. The filler may be formed of steel wire wound in the fashion of a spool about the core. One or more baffles may be situated within the filler to extend the length of the path taken by fluid flowing from the influent passageway through the filler to the core and then through the effluent passageway. Solution flowing through the filler reacts therewith so that silver is deposited within the container. An opening may be provided in the top of the container to permit viewing of the contents to determine whether the capacity of the container has been exhausted or whether the device is operating properly. The inlet and outlet passageways may be situated on the side of the container to provide easier connection and disconnection from the user's equipment. A bypass may be provided within the container to permit flow of the solution from the influent passageway to the effluent passageway in the event of clogging or other defects within the container.

17 Claims, 4 Drawing Figures

SILVER RECOVERY UNIT

BACKGROUND OF THE INVENTION

1. Field of the Invention

This invention relates to the art of silver recovery and, more particularly, to a gravity flow apparatus for use in the recovery of silver from spent photographic fixer solution.

2. Description of Prior Art

A number of devices employing containers for recovering silver from spent fixing solutions in photographic paper and film processes are known in the industry. These devices generally entail passing the solution containing silver salts through a metal which is above silver in the electromotive force series. The resultant chemical replacement action causes silver to be deposited within the container as the metal is dissolved. When the metal is exhausted, the contents of the container are processed at a refinery to recover the silver therein.

U.S. Pat. No. 3,369,801, which issued to Harlan G. Hartman on Feb. 20, 1968, discloses a vessel in which the solution flows downward through a core tube to the bottom of the vessel and thence upward through steel wool to an outlet in the top of the vessel. The chemical reaction referred to above results in the deposition of silver within the vessel as the steel wool dissolves.

Window screen is used as the filler material in U.S. Pat. No. 3,630,505, which issued to Byron R. MacKay on Dec. 28, 1971. The screen wire is therein said to be an improvement because steel wool fibers are quite small in diameter and are easily dissolved. As a consequence, large openings providing less resistive paths are created, permitting the solution to bypass the filler material and to exit the vessel with the silver remaining in solution. In U.S. Pat. No. 3,630,505 the solution fluid is directed through a flow path from the inside surface of the container, through the screen, and upward from the bottom of the core tubing.

U.S. Pat. No. 3,655,175, which issued to Victor Zeleny, et al on Apr. 11, 1972, discloses a cannister in which the solution flows from the bottom of the core tube upward through metal shavings and a bed of neutralizing material of alkaline earth metal carbonates. U.S. Pat. No. 3,655,175 also discloses horizontal spacers or baffles separating the layers of shavings to prevent short circuitry of the solution as it flows upward through the filler material.

U.S. Pat. No. 3,840,217, which issued to Michael T. MacKay on Oct. 8, 1974, discloses a plastic container with influent and effluent liquid passages in the form of T-connectors in its lid. The lower end of the influent tube is a T-shaped baffle for dispersing the influent solution. A U-shaped tube is connected between the influent and effluent connectors to accomodate solution overflow. Furthermore, the U-shaped tube is removable from the effluent connector to permit testing of the effluent solution to determine whether silver is being efficiently removed from the solution.

SUMMARY OF THE INVENTION

The efficiency and the ease of operation of the prior art devices, including the patented containers discussed above, vary according to the structural and operational characteristics of each. The performance of the prior art has been substantially improved upon by the novel structure embodied in the present invention. An elongated core is provided with an aperture in its side for receiving fluid which has passed through the filler material. A filler of wound wire provides a large amount of surface area for contact with and chemical reaction with the fixer solution. Furthermore, a system of baffles increases the length of the flow path of solution within the vessel, increasing the efficiency of the reactive process occurring therein. Inlet and outlet connections are provided on the side of the container to permit easier connection and disconnection by the user. A bypass system is provided to direct fluid from the influent passage to the effluent passage in the event the core or the filler becomes clogged. In addition, an opening is provided in the lid of the container to permit inspection of the filler so that the user can visually determine when the filler has been exhausted.

It is, therefore, an object of the present invention to provide an improved silver recovery cannister for recovering silver from fluid solutions containing silver ions.

Another object of the present invention is the provision of a silver recovery vessel with improved efficiency over prior art devices.

Yet another object of the present invention is the provision of a filler with large surface area and minimal susceptibility to corrosion and dissolution, so as to reduce the occurrence of resistance-free, non-reactive flow paths within the filler.

A further object of the present invention is the provision of an extended flow path within a silver recovery container without an increase in the size of the container.

A still further object of the present invention is the provision of a silver recovery cannister that can be easily connected or disconnected by the user.

A still further object of the present invention is the provision of a bypass of the core and filler in the event that solution is unable to pass through either.

Another object of the present invention is the provision of a silver recovery cannister which easily permits the user to visually inspect the filler material.

Other and further objects, features, and advantages will be apparent from the following description of presently preferred embodiments of the invention, given for the purpose of disclosure, when taken in conjunction with the accompanying drawings.

BRIEF DESCRIPTION OF THE DRAWINGS

The invention will be more readily understood from a reading of the following specification and by references to the accompanying drawings, forming a part thereof, wherein examples of embodiments of the invention are shown, and wherein.

DESCRIPTION OF PREFERRED EMBODIMENTS

By way of illustration and not limitation, this detailed description presents preferred embodiments of the invention. It will be readily apparent to one skilled in this art that the device can be incorporated in manners similar to the way in which it is here illustrated without departing from the scope of my invention.

Figure 1:
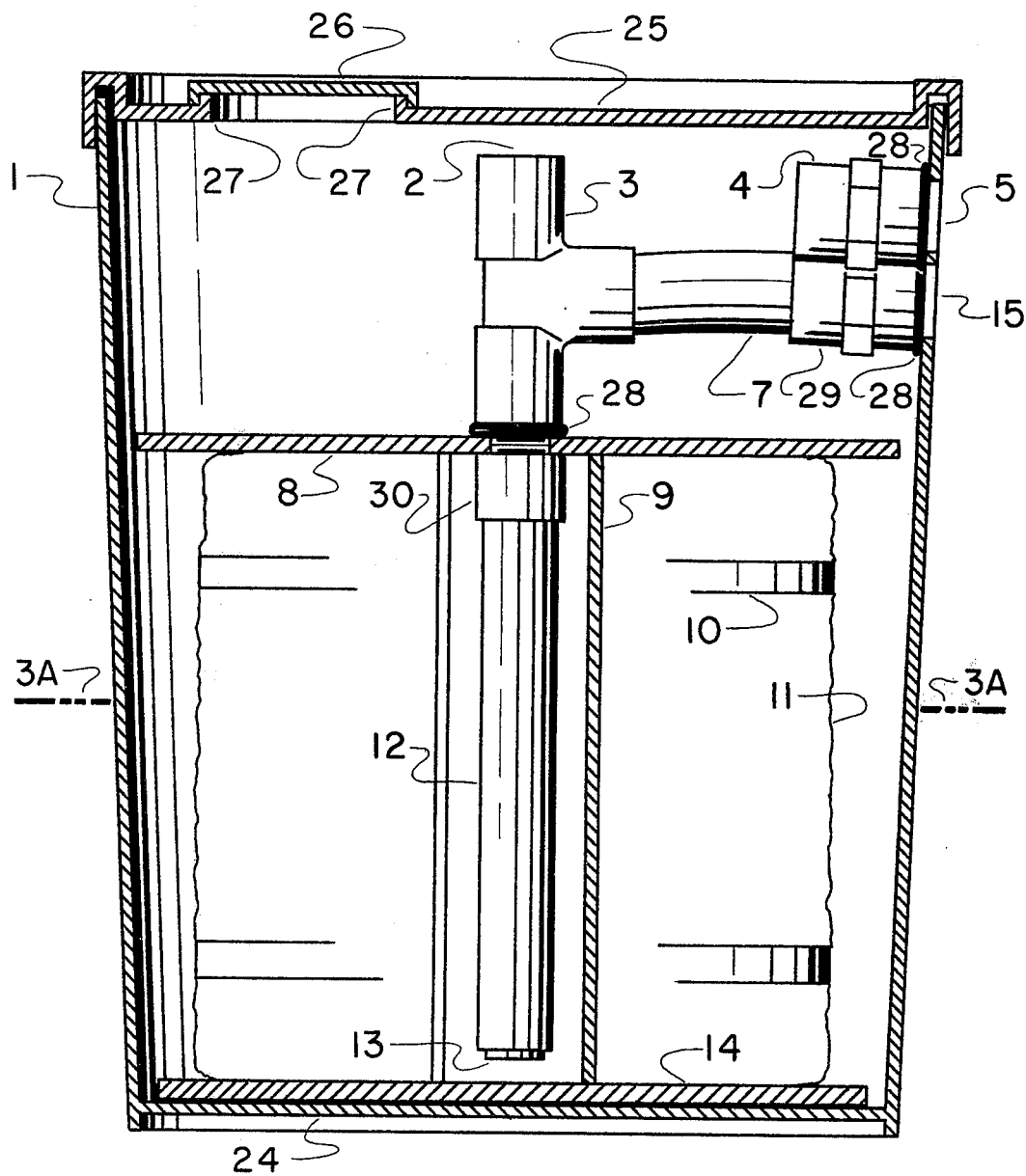
FIG. 1 is an elevation view, with a portion in cross-section, of an embodiment of the present invention.

Referring to the drawing, the reference numeral 1 designates the wall of the container which forms the housing for this apparatus. In the embodiment illustrated in FIG. 1, the container is a bucket with a flat bottom 24 and a removable lid 25 which fastens to the container wall 1 in a press-fit assembly. The container components are preferably constructed of plastic material so as to be lightweight and inert to the photographic fixing solution. Also illustrated in FIG. 1 is viewing cap 26, which provides the user with a means for viewing the contents of the container, without disrupting its operation, in order to determine whether the unit is operating properly and whether the filler material has been depleted. Viewing cap 26 may be made of clear plastic and friction-fitted to shoulder 27 in lid 25, as shown. Alternatively, cap 26 may be threaded to permit engagement with threads (not shown) on shoulder 27. Other forms of viewing caps may also be used. Viewing cap 26 may even be made of opaque material, in which event cap 26 must be physically removed from lid 25 to permit inspection of the contents. Although not shown in the drawing, the fluid-tightness of the lid-wall assembly may be enhanced by providing a sealing ring in the perimeter area of the lid 25 in a manner well known in the art.

Fluid influent means 4 in the preferred embodiment is shown provided in the form of a passageway through the container wall 1 at an influent opening 5 substantially near the upper portion of wall 1. Influent means 4 may be constructed in a number of manners well known in the art so as to provide an inert passageway from the user's fixing solution to the upper level of the container interior. In the preferred embodiment, ¾ inch Schedule 40 PVC tubing is threaded on one end to receive a similarly threaded and mating fitting through influent opening 5 from an influent line (not shown) through which solution flows from the user's processing equipment. O-rings 28, on either side of influent opening 5, enhance the fluid-tightness of the influent means assembly 4.

Effluent opening 15 is a similar opening in container wall 1, but is located at a height below that of influent opening 5 so that gravity forces the flow of solution through the container from influent opening 5 to effluent opening 15. Fluid effluent means 29 is preferably constructed in like manner to influent means 4 and provides a passageway through the container wall 1 for solution that has been processed by the silver recovery container of this invention. The location of influent means 4 and effluent means 29 on the side wall of the container, as shown in the illustrated embodiment, permits the connection and disconnection of the cannister from the user's equipment without the necessity of removal of lid 25. Placement of the inlet and outlet line in the side of the container is also advantageous over prior art devices where those lines are connected through the top of the container. With the prior art construction it is necessary to have a good seal on the lid as well as on the junctions of the inlet and outlet lines to the container. With the preferred construction disclosed herein, the seal on the lid is less critical. Furthermore, the illustrated structure permits the user to remove the cannister when the filler has been exhausted and to connect a new cannister to his equipment merely by removing the external connectors (not shown) that engage influent and effluent means 4 and 29. No complicated equipment is required, no unusual mechanical skill is required, and the user need not comprehend the operation of the cannister to make the physical connection or removal from his system. Once a used cannister is removed and replaced by a fresh one, the user need not do anything with the cannister; the lid remains in place until refinery personnel remove it to extract the silver desposited therein.

Preferably in the center of the vessel, and preferably formed generally in a hollow, elongated, cylindrical shape is core 12. Core 12 is closed at its lower end, which closure may be accomplished by molding or by insertion of core plugs 13 which can be press-fitted, adhesively bonded, or otherwise inserted into core 12 to prevent solution from entering tube 12 through its otherwise-open lower end. As mentioned, in the illustrated embodiment, the axis of core 12 coincides with the vertical axis of the container, although the device of the present invention is not limited to such construction.

Figure 2:
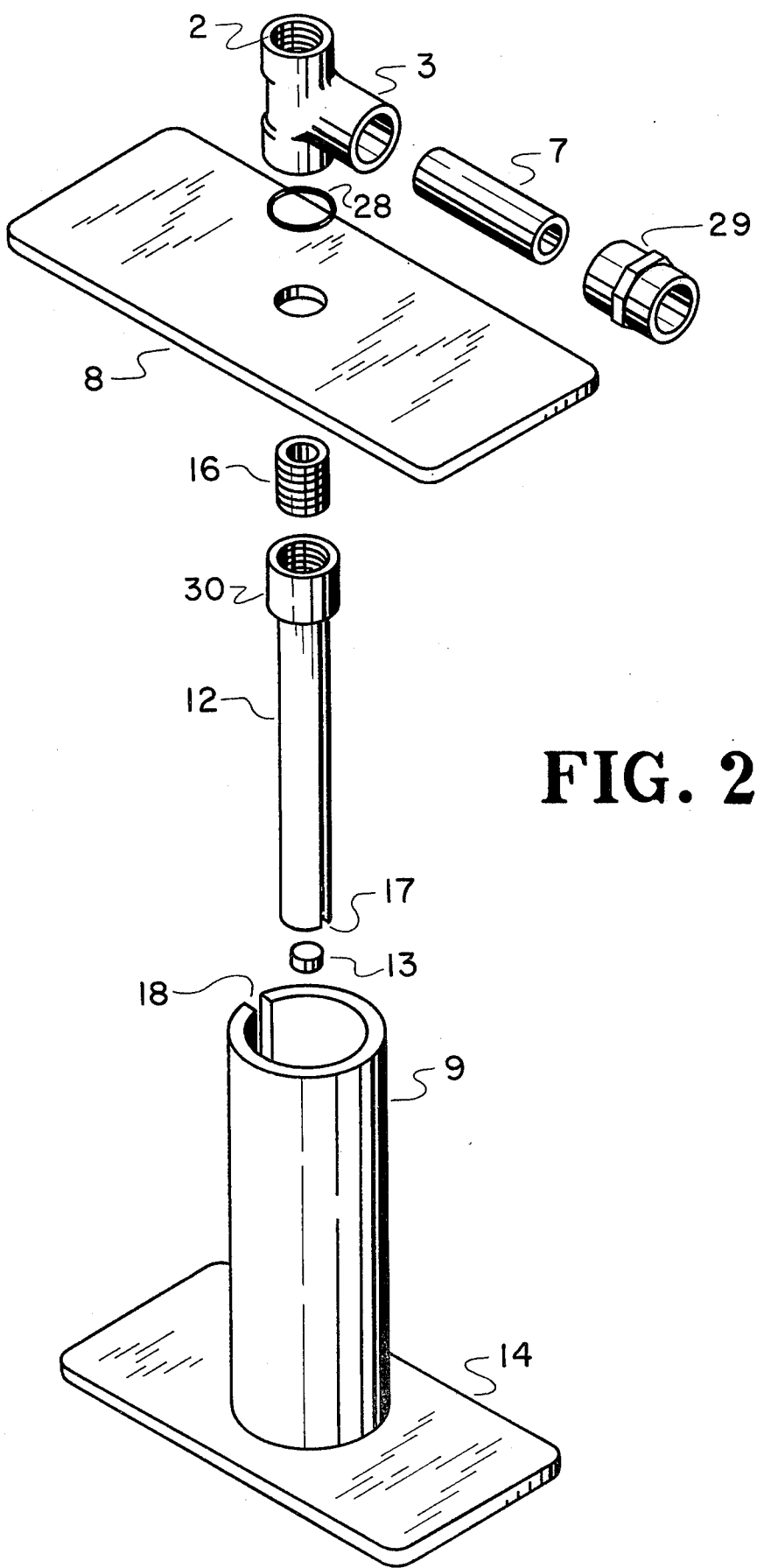
FIG. 2 is an exploded perspective view of a portion of the embodiment shown in FIG. 1.

A novel feature of core 12 is the aperture 17 in the side thereof. The aperture 17 provides an opening for solution to pass through the wall of the core into the longitudinal passageway in the core interior and, thence, on to effluent means 19. Of course, core 12 is, like all of the components shown in FIG. 2, constructed of material inert to the solution. FIG. 2 illustrates the preferred core construction, with the aperture 17 extending substantially the length of core 12 so that the illustrated elongated aperture 17 forms a slot in core 12 from core plug 13 to the core threaded connector 30 at the core's upper end. The benefits of this novel and non-obvious construction will be apparent from the discussion below.

The core 12 is connected to effluent means 29 in the preferred embodiment via connector 16, core connector 3, and effluent hose 7. Splash guard 8 is also connected to this assembly, as shown, and, because of its location below the influent means 4, serves to disperse fluid entering the container so that such fluid is distributed generally about the interior of the vessel. Additionally, splash guard 8 serves to prevent solution from bypassing the filler 11 and entering the top of core 12, and splash guard 8 provides support of the core assembly in the event that the unit is turned on its side. Although shown in rectangular fashion in the illustrated embodiment, the precise shape of splash guard 8 is not limited to that configuration. Preferably, guard 8 is constructed of clear plastic to permit inspection of a greater portion of the filler 11, such as when an inspection is made by the user through viewing cap 26.

In the illustrated assembly, core connector 3 is a T-shaped tube transforming the flow of fluid from its upwardly vertical path in the interior of core 12 to a substantially horizontal path outward to effluent means 29 and effluent opening 5. Effluent hose 7 may be constructed as a separate coupler between core connector 3 and effluent means 29, and may be made of flexible vinyl to provide easier connections therewith and to prevent its breakage if the core assembly is rotated. Such connections should, of course, be fluid tight.

If foreign matter gets into the vessel and clogs core 12 or any of the other elements hereinafter described, the level of fluid in the vessel will continue to rise since its path to the effluent opening 15, as described below, will be blocked. In such an event, it is desirable to provide an outlet for the solution so that the container does not continue to fill until it bursts. Core connector 3 is provided with overflow opening 2 at a height above effluent opening 15 to serve such a purpose. In the event that the aforementioned blockage occurs, the fluid level in the container rises only until it reaches the overflow opening 2. Thereafter, the solution flows downward through core connector 3 and through effluent means 29 out of the vessel. The user of the cannister, when making a periodic visual inspection of the interior through viewing cap 26, will observe the level of the solution, discern that a blockage has occurred, and replace the defective cannister with a new one.

In one of the simpler embodiments of the present invention, filler material 11 is disposed about core 12 between the lower surface of splash guard 8 and the upper surface of container bottom 24. As taught in the prior art discussed above, such filler 11 is formed of a metal above silver in the electromotive force series. Devices of the prior art commonly utilize steel wool or woven screen wire for filler, and those materials are likewise appropriate fillers for use in the device of the present invention. There are, however, certain disadvantages inherent in some of these known fillers. For instance, steel wool lacks resistance to corrosion caused by the fixing solution and is subject to uneven dissolution, so that resistance-free openings are formed in the filler 11. These openings permit fluid to pass through without the desired ion exchange occurring. Some existing filler materials have also been known to expand and burst the container, creating a messy loss to the user. Steel wool has also been known to soak up some undesirable elements, such as sulphur, making the subsequent processing more difficult.

An additional material that has been found suitable for use in the present invention, and which is believed to be a novel and improved filler, is wound steel wire. The wire may be wound in the fashion of a spool about the core 12 to provide a filler 11 of desired capacity. When such a filler is used, however, the wire should not be wrapped so tightly as to prevent the filler from being transversely permeable. It will be appreciated by those skilled in the art that the diameter of the filler spool 11 may be varied, within limits posed by the size of the particular container utilized, so as to provide recovery units of varying capacity. Large users can be provided with a large cannister substantially filled from its core 12 to the container wall 1 with filler 11. Smaller users can perhaps make more efficient use of lesser containers or of uniform containers with lesser amounts of filler within. Steel wire having a diameter of 0.009 inch has been found suitable for this filler, although the invention is not limited to wound wire of that dimension, or to wound wire at all, as even the previously known filler materials can be accomodated in a vessel of this novel structure and operation. It will be appreciated, however, that low carbon steel wire may be preferred because of its cheap cost. The illustrated embodiment includes filler fastener 10 for providing support along the periphery of filler 11. Fastener 10 may take the form of a metal band, staples, a rubberband, or any similar device suitable for supporting the filler within its intended confines in the vessel interior.

The invention discussed above is yet further improved upon by the addition of a baffle structure of a fashion illustrated in the accompanying drawings. For example, in the preferred embodiment, support baffle 9 is generally disposed about the periphery of core 12 and has an axis common to that of core 12. PVC has been found suitable for constructing said support baffle 9. Filler 11 is placed in the area between the outer wall of the core 12 and the inner wall of support baffle 9. Additional filler is formed about the outer surface of support baffle 9, thereby providing two layers of filler separated by support baffle 9. Support baffle 9 is provided with an aperture 18 in the wall thereof to permit the flow of solution from the outer layer of filler to the inner layer. The drawing illustrates a preferred embodiment of support baffle 9 in which the aperture 18 in the wall thereof extends longitudinally the length of baffle 9 to form a slot similar to that of the core aperture 17. A still more preferred embodiment, illustrated in FIG. 2, disposes apertures 17 and 18 in opposite directions. This construction, also novel in the art, extends the length of the flow path of solution through a filler of any given diameter, exposing a greater portion of the filler to any given volume of solution, thereby increasing the efficiency with which the filler 11 displaces silver in the solution.

In the illustrated embodiment, the upper edge of support baffle 9 is conventionally connected in a fluid-tight manner to the lower surface of splash guard 8, while its lower edge is similarly connected in fluid-tight fashion to the upper surface of filler support 14. Filler support 14 prevents solution from bypassing the filler 11 and flowing directly to core 12. It also serves to center the core assembly within the cannister in the event the cannister is turned on its side. With this configuration, solution entering the vessel through influent means 4 is dispersed generally to the peripheral surface of the outer layer of filler 11 (although filler 11 can extend to the inner surface of wall 1 of the container). Fluid then flows through the outer filler layer towards the outer surface of support baffle 9, thence through support baffle aperture 18. The solution traverses the inner layer of filler 11 toward the outer surface of core 12 and around to and through core aperture 17. Having passed through the multi-layered filler and the silver salts therein having reacted with the filler metal, the effluent solution travels the previously described path through the effluent opening of the vessel.

A still further and patentably distinct embodiment entails the inclusion of additional baffles interspersed within the several layers of filler 11. FIG. 3B illustrates the use of baffles 22 and 23 within the filler material situated between core 12 and support baffle 9. Baffles 22 and 23 need not be constructed of weight-supportive material like that used in support baffle 9. Instead, it has been determined, for instance, that heavy guage plastic sheeting, preferably disposed concentrically with core 12 and support baffle 9, functions adequately.

Figure 3A:
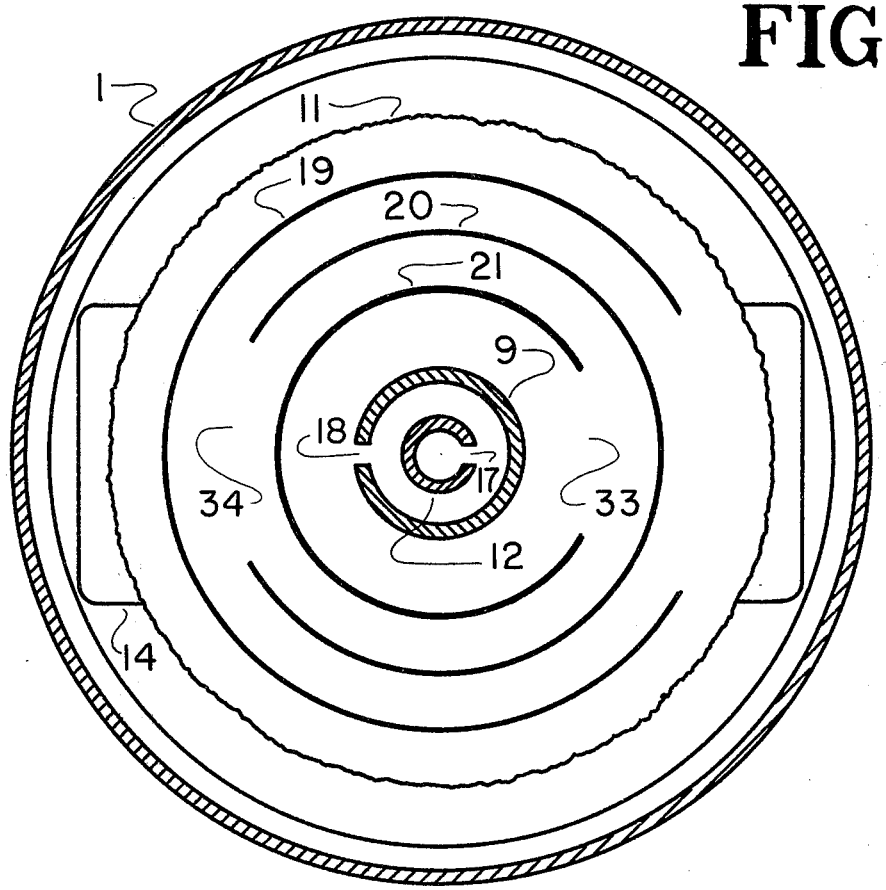
FIG. 3A is a cross-sectional view taken along lines 3—3 of FIG. 1.
Figure 3B:
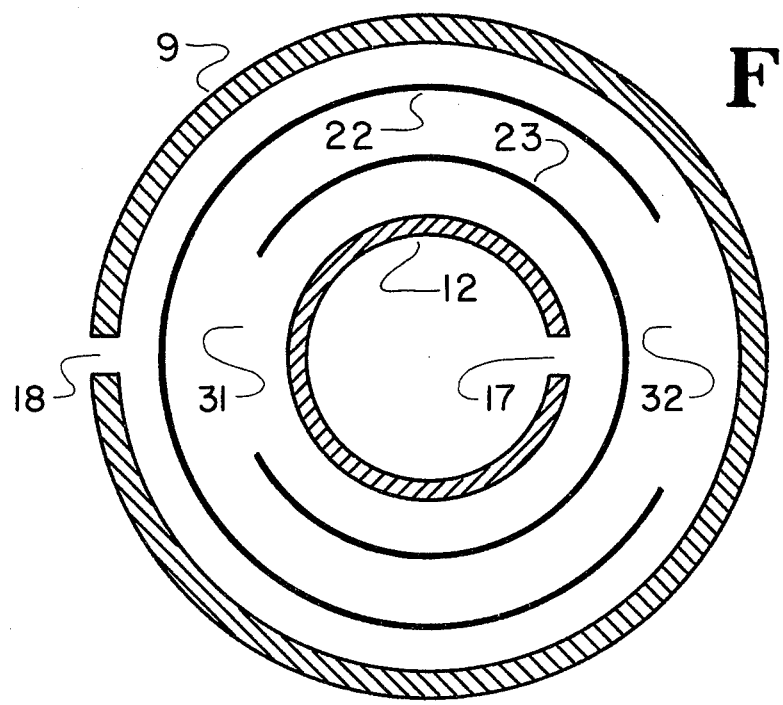
FIG. 3B is a partial cross-sectional view of an alternative embodiment of the invention, as taken along lines 3—3 of FIG. 1.

In the preferred embodiment, with the additional baffles, whether situated between core 12 and support baffle 9, as shown in FIG. 3B, and/or situated between support baffle 9 and the periphery of filler 11, as shown in FIG. 3A, the aperture in each particular baffle is placed in the opposite direction of the apertures of the baffle, or the support baffle, or the core on either side of the particular baffle under examination. As an example, the aperture 31 in baffle 23 is generally revolved 180° degrees from the apertures 17 and 32 in core 12 and baffle 22 respectively. Similarly, the aperture 33 in baffle 21, located between support baffle 9 and the periphery of the filler 11, is generally revolved 180° degrees from apertures 18 and 34 in support baffle 9 and baffle 20 respectively. This construction is preferably continued throughout the layers of filler and baffles 19, 20, 21, and etc., thereby multiplying the benefits of extended flow paths as discussed above. With this alternating positioning of baffle apertures, aperture 18 in support baffle 9 may or may not be in the illustrated opposite direction from aperture 17 of core 12, depending on whether there is an odd or even number of baffles situated between core 12 and support baffle 9. Various other changes may be made, such as the inclusion of additional support baffles, or the exclusion of the support baffle 9 altogether, depending on the desired size and capacity of the particular vessel, without departing from the teachings or the spirit of this invention.

With the extended flow path of this structure, it will be seen that the effective surface area of metal filler 11 is increased, and the exposure of solution to filler is greatly enhanced, for any given size vessel or any given weight of filler. Furthermore, while the preferred embodiment incorporates wound steel wire for each layer of filler 11, conventional filler, such as steel wool, can be used. If steel wool is, in fact, used in this invention, its previous disadvantages are somewhat eliminated by this new manner of construction. For example, one of steel wool's major drawbacks is its susceptibility to partial dissolution so that resistance-free flow paths are formed in which the solution fails to react with the filler. With the sandwich construction of filler and baffles of the present invention, dissolution of filler in one layer does not permit the solution to bypass the remaining filler. This obtains for the user a more efficient and economical use of his recovery cannister.

The present invention, therefore, is well adapted to carry out the objects and attain the ends and advantages mentioned as well as those inherent therein. While presently preferred embodiments of the invention have been given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. Apparatus for recovering silver from a silver-containing solution, comprising:
    a container constructed of material that is non-reactive with the solution;
    influent means connected to the container for introducing solution into the container;
    effluent means connected to the container at a height below that of the influent means for removing solution from the container;
    core means of elongated shape and being closed at its lower end and connected to said effluent means at its upper end, said core means having a longitudinal passageway extending therethrough, and said core means having an aperture in the side thereof;
    splash guard means, having upper and lower surfaces, said splash guard means connected to the upper end of the core means at a height below that of the level of the influent means, for dispersing the solution entering the container;
    inner filler means peripherally disposed about the core means, said inner filler means being formed from a metal above silver in the electromotive force series;
    baffle means having upper and lower edges and being peripherally disposed about the inner filler means, said baffle means being contructed of material that is non-reactive with the solution, and wherein the upper edge of said baffle means is attached to the lower surface of said splash guard means, and the lower edge of said baffle means rests on the bottom of the container, and said baffle means having an aperture in the side thereof; and
    outer filler means peripherally disposed about the baffle means, said outer filler means being formed from a metal above silver in the electromotive force series.

2. The apparatus of claim 1 wherein the aperture in the side of the baffle means extends the length thereof.

3. The apparatus of claim 1 wherein said outer filler means is a spool of wire wound about the baffle means.

4. The apparatus of claim 1 wherein the aperture in the side of said baffle means is substantially opposite the aperture in the side of said core means.

5. The apparatus of claim 1 wherein said baffle means is constructed of inert plastic.

6. The apparatus of claim 1 further comprising outer filler fastener means attached to the outer filler means for providing support thereto.

7. The apparatus of claim 1, further comprising:
    lower support means, having upper and lower surfaces, the upper surface of said lower support means being connected to the lower edges of said inner filler means, baffle means, and outer filler means.

8. The apparatus of claim 1 wherein the upper edge of said baffle means is connected to the lower surface of said splash guard means in a fluid-tight junction.

9. The apparatus of claim 7 wherein the upper edge of said baffle means is connected to the lower surface of said splash guard means in a fluid-tight junction, and the lower edge of said baffle means is connected to the upper surface of said lower support means in a fluid-tight junction.

10. The apparatus of claim 9, further comprising:
    one or more inner baffle means concentrically disposed within the inner filler means, each said inner baffle means being constructed of material that is non-reactive with the solution, each said inner baffle means having an aperture in the side thereof, and each said inner baffle means having an axis common to that of said core means and baffle means.

11. The apparatus of claim 10 wherein the aperture in each said inner baffle means extends the length thereof.

12. The apparatus of claim 10 wherein the apertures of the core means, inner baffle means, and baffle means are each substantially opposite the aperture of the core means or inner baffle means immediately preceding it as each such means advances beyond their common axis.

13. The apparatus of claim 11 wherein said inner baffle means is constructed of plastic.

14. The apparatus of claim 9, further comprising:
    one or more outer baffle means concentrically disposed within the outer filler means, each said outer filler means being constructed of material that is non-reactive with the solution, each said outer baffle means having an aperture in the side thereof, and each said outer baffle means having an axis common to that of the, core means and the baffle means.

15. The apparatus of claim 14 wherein the aperture in each said outer baffle means extends the length thereof.

16. The apparatus of claim 14 wherein the apertures of the core means, baffle means, and outer baffle means are each substantially opposite the aperture of the core means, baffle means, or outer baffle means immediately preceding it as each such means advances beyond their common axis.

17. The apparatus of claim 14 wherein said outer baffle means is constructed of plastic.

* * * * *